US009385639B2

(12) United States Patent
Maiocchi (10) Patent No.: US 9,385,639 B2
(45) Date of Patent: Jul. 5, 2016

(54) SWITCHING CONTROLLER FOR ELECTRIC MOTORS AND RELATED METHOD OF CONTROLLING ELECTRIC MOTORS

(71) Applicant: STMicroelectronics S.r.l., Agrate Brianza (MB) (IT)

(72) Inventor: Giuseppe Maiocchi, Capiago Intimiano (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 44 days.

(21) Appl. No.: 14/284,636

(22) Filed: May 22, 2014

(65) Prior Publication Data

US 2014/0354201 A1 Dec. 4, 2014

(30) Foreign Application Priority Data

May 28, 2013 (IT) .............. MI2013A0860

(51) Int. Cl.
*H02P 6/14* (2016.01)
*H02P 6/00* (2016.01)
*H02P 6/08* (2016.01)
*H02P 6/18* (2016.01)

(52) U.S. Cl.
CPC ............... *H02P 6/002* (2013.01); *H02P 6/085* (2013.01); *H02P 6/182* (2013.01); *H02P 2203/00* (2013.01); *H02P 2207/05* (2013.01)

(58) Field of Classification Search
CPC ............ H02P 6/02; H02P 6/08; H02P 6/001; H02P 8/34; H02P 6/002; H02P 6/085; H02P 6/182; H02P 2203/00; H02P 2207/05; G11B 19/28; Y10S 388/911
USPC ............ 318/400.25, 400.12, 400.33, 400.35, 318/721, 459, 705, 400.27; 360/73.03; 388/911; 363/19, 17, 21.01, 21.05, 363/21.1, 21.11, 21.13, 21.18, 22, 28; 327/100–103
See application file for complete search history.

(56) References Cited

U.S. PATENT DOCUMENTS

| | | | | |
|---|---|---|---|---|
| 5,272,424 A * | 12/1993 | Lee | ............... | H02P 6/14 318/400.38 |
| 5,469,215 A * | 11/1995 | Nashiki | ............... | H02P 6/10 318/432 |
| 5,472,424 A * | 12/1995 | Lampropoulos | .. | A61M 25/1018 604/100.03 |
| 5,838,128 A * | 11/1998 | Maiocchi | ............... | H02P 8/34 318/400.12 |
| 6,137,253 A * | 10/2000 | Galbiati | ............... | H02P 6/14 318/254.2 |
| 6,900,604 B2 * | 5/2005 | Kokami | ............... | H02P 6/182 318/400.33 |
| 7,230,785 B2 * | 6/2007 | Itagaki | ............... | G11B 19/28 360/73.03 |
| 7,332,886 B2 * | 2/2008 | Maiocchi | ............... | G11B 5/5526 318/599 |
| RE42,113 E * | 2/2011 | Maiocchi | ............... | G11B 19/28 318/599 |

(Continued)

FOREIGN PATENT DOCUMENTS

EP 0800263 8/1997
EP 0955721 10/1999

(Continued)

*Primary Examiner* — Rita Leykin
(74) *Attorney, Agent, or Firm* — Allen, Dyer, Doppelt, Milbrath & Gilchrist, P.A.

(57) ABSTRACT

A switching controller of a poly-phase electric motor may generate, in a fully digital manner, a replica of the phase current and/or of the phase (star) voltage of one or more windings of the motor. The switching controller may use digital signals already available for driving the motor to reconstruct a replica of the phase current or the phase voltage, and thereby avoid the need for dedicated analog components for phase current or phase voltage determination.

16 Claims, 6 Drawing Sheets

(56) References Cited

U.S. PATENT DOCUMENTS

| | | | |
|---|---|---|---|
| 7,990,122 B2 * | 8/2011 | Sase | H02M 3/157 323/283 |
| RE43,946 E * | 1/2013 | Sase | H02M 3/157 323/283 |
| 8,415,908 B2 * | 4/2013 | Galbiati | H02P 6/085 318/400.2 |
| 8,907,611 B2 * | 12/2014 | Qin | H02P 27/08 318/400.02 |
| 2005/0077854 A1 | 4/2005 | Lelkes et al. | |
| 2011/0156622 A1 | 6/2011 | Galbiati | |

FOREIGN PATENT DOCUMENTS

| | | |
|---|---|---|
| EP | 800262 | 7/2001 |
| EP | 809349 | 7/2001 |

* cited by examiner

FIG. 1
*PRIOR ART*

$V_A - V_{CT} = BEMF_A + R \cdot I_A + L \cdot \partial I_A / \partial t$

$V_A - V_{CT} = BEMF_A \quad I_A = 0 \text{ AND } \partial I_A / \partial t = 0$

FIG. 2
PRIOR ART

TIME

SWITCHING CONTROLLER FOR ELECTRIC MOTORS AND RELATED METHOD OF CONTROLLING ELECTRIC MOTORS

TECHNICAL FIELD

The present invention relates to techniques for driving an electronically-switched motor and, more particularly, to a switching controller of a poly-phase electric motor and a related method of controlling electric motors.

BACKGROUND

Electronically-switched DC motors, as well as stepper motors (or more generally brushless motors), are used in numerous control and regulation applications, and also in drive systems of mass memory devices such as hard disks, floppy disks, optical disks, CD-ROMs, tape streamers and the like. These motors are typically poly-phase motors having windings connected in a "star" or polygonal configuration. Hereinafter reference will be made to a three-phase electric motor with star-connected windings, though the same observations hold, with minor changes, for an electric motor with delta-connected windings and for a generic poly-phase motor.

Figure 1:
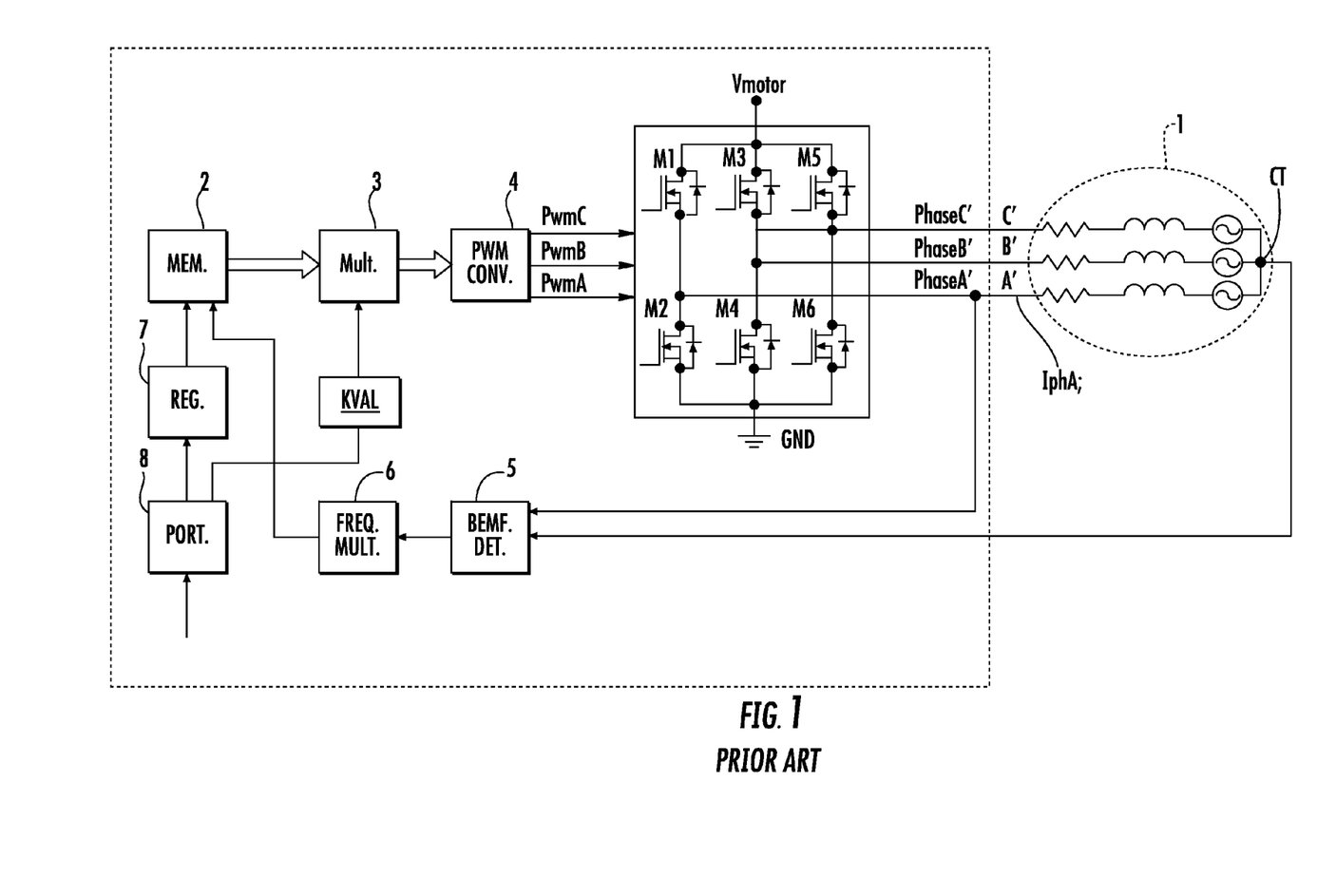
FIG. 1 is a schematic block diagram of a prior art smooth driver of an electric motor.

Brushless motors may be driven using a switching controller of the type shown in FIG. 1, commonly referred to as a "smooth driver", and illustrated in detail in U.S. Pat. Pub. No. 2011/0156622, the disclosure of which is herein incorporated herein in its entirety by reference. The output stage is represented by a poly-phase full-wave bridge circuit which, in the case of a three-phase motor, may employ six bipolar (BJT) or field effect (MOS) power transistors.

Typically, a brushless motor is driven by properly powering the motor phases synchronously with the instantaneous position of the motor. This may be done by sequentially exciting two of the motor's windings with positive and negative voltages respectively, leaving a third winding in a high impedance state (tri-state). When driving a "sensorless" brushless motor, the non-excited phase winding is exploited for detecting the rotor's position. Excitation voltages or currents are applied to the phase windings of the motor and, instead of having a certain pre-established constant level during each switching phase, a certain pre-established (non-constant) drive voltage or current profile, respectively, is digitized and stored in a nonvolatile static memory device, e.g., in an EPROM or EEPROM memory. This technique is described in European Patents EP 800262, EP 800263, EP 809349 and from the U.S. Pat. No. 6,137,253, the disclosures of which are hereby incorporate herein in their entireties by reference, and thus will not be discussed further herein.

Figure 2:
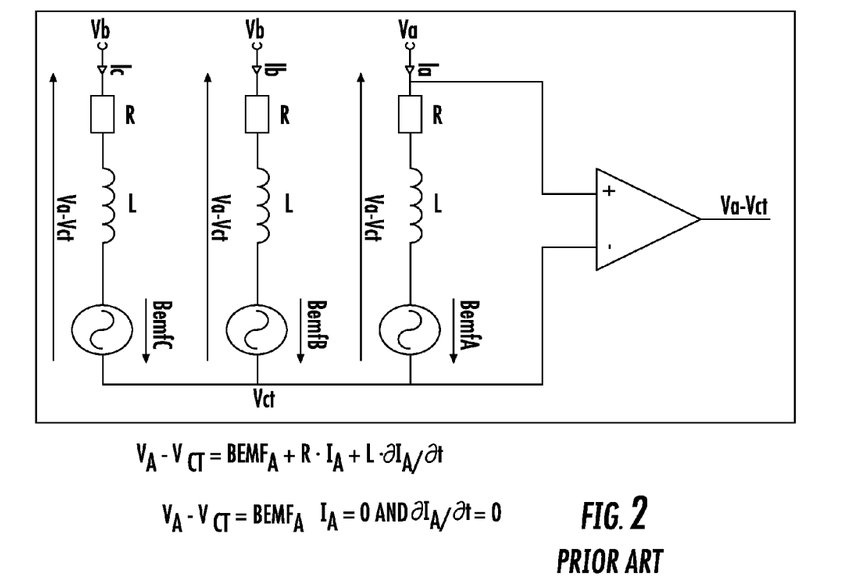
FIG. 2 is a schematic diagram of a prior art analog sensing circuit including an operational amplifier configured to sense the back-electromotive force induced in a winding of an electric motor.

To properly energize the windings, the position of the rotor of the motor is determined with a circuit (which in FIG. 1 is provided in block 5) for sensing the back electromotive force (BEMF) induced in a tri-stated winding. For a star-connected three-phase motor, such a sensing circuit may be as depicted in FIG. 2. Each winding of the motor is schematically represented as a series connection of a resistor R (representing the series resistance of the winding), an inductor L (representing the inductance of the winding), and an oscillating voltage generator BemfA (BemfB or BemfC), which represents the back electromotive force induced in the winding by the motion of the rotor of the motor. In FIG. 2, Va, Vb and Vc are the driving voltages applied to the phase terminals of the motor, Vct is the center-star voltage, and Ia, Ib and Ic are the phase currents flowing throughout the windings of the motor. In the ensuing description, the expression "phase voltage" will designate the difference between the driving voltage of any winding (Va, Vb, Vc) and the center-star voltage (Vct), and the same labels in the various figures indicate the same components.

Figure 3:
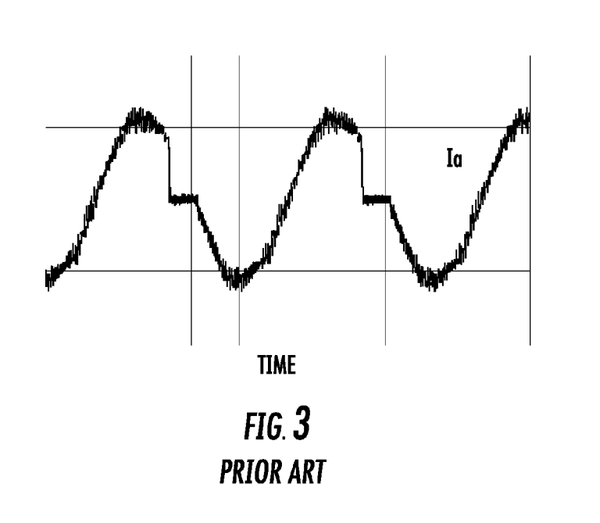
FIG. 3 is a time graph of a typical phase current when the back-electromotive force induced in a winding is sensed by tri-stating the winding during a time window.

A first known method for sensing the back electromotive force $BEMF_A$ includes generating a time window of a short duration during which the output node of one of the half-bridge stages that drive the windings of the motor is tri-stated, as schematically illustrated by the time graph of FIG. 3. This is represented by the following equation:

$$V_A - V_{CT} = BEMF_A + R \cdot I_A + L \cdot \partial I_A / \partial t$$

Thus, when the winding A is tri-stated, the phase current $I_A$ flowing therethrough and its time derivative are null, and the back electromotive force $BEMF_A$ induced thereon equals the phase (star) voltage $V_A - V_{CT}$. This method includes the steps of:

tri-stating at least a winding of the motor; enabling a logic gate asserting a zero-cross event of the back electromotive force BEMF sensed by a sensing circuit after a certain time from the instant in which the winding is tri-stated; and resuming from the high impedance state after the assertion of a zero-cross event.

Figure 4:
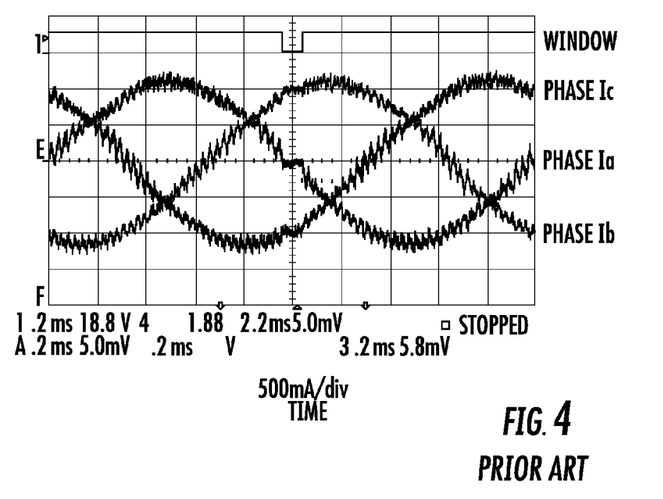
FIG. 4 is a time graph of typical the phase currents of a three-phase motor showing distortions of the phase currents $I_B$ and $I_C$ due to tri-stating the winding A for sensing the back-electromotive force induced thereon.

This technique produces discontinuities in motor driving torque. It also generates a certain amount of acoustic noise, and induces distortions in the other motor phases that are not temporarily tri-stated, as shown in the exemplary time graph of FIG. 4.

Figure 5:
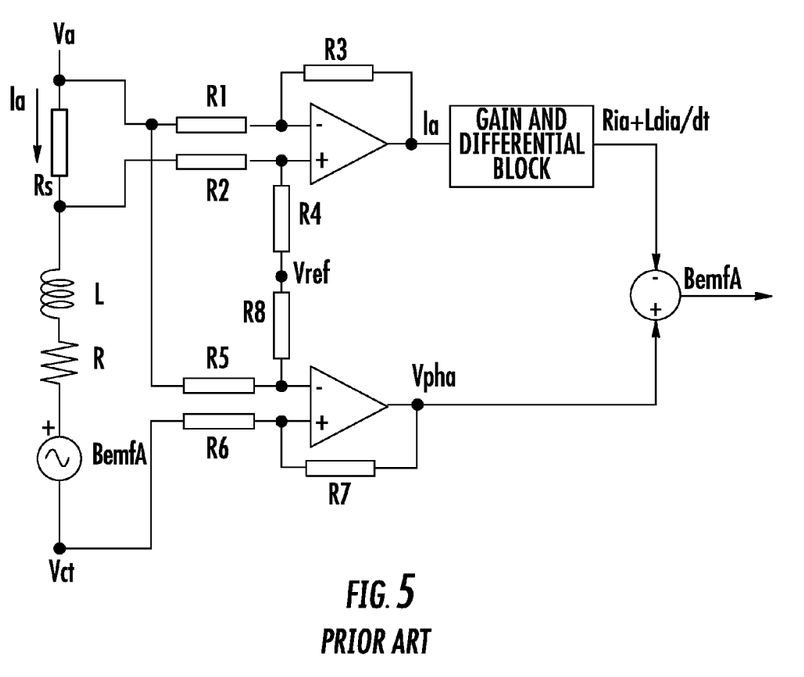
FIG. 5 is a schematic block diagram of a prior art analog circuit for generating analog replica signals of the phase current, the phase voltage, and the back-electromotive force induced in a winding.
Figure 6:
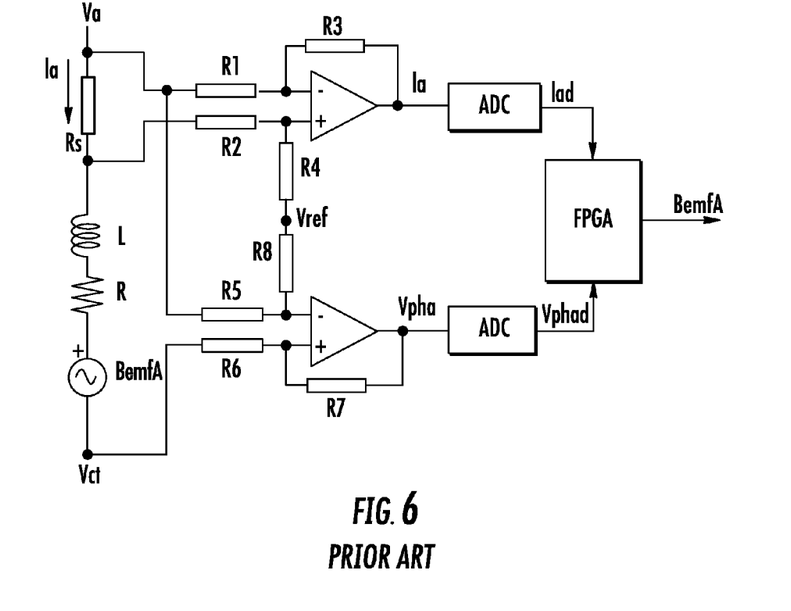
FIG. 6 is a schematic block diagram of a prior art analog circuit for generating a digital replica signal of the back-electromotive force induced in a winding by analog-to-digital converting replica signals of the phase current Ia and of the phase voltage Vpha.

According to another technique, the back electromotive force $BEMF_A$ is reconstructed in an analog fashion with a circuit for reconstructing the phase voltage Vpha and the phase current Ia, e.g., using the circuits shown in FIGS. 5 and 6. In these prior circuits, the phase current Ia is sensed with a sense resistor Rs, connected in series to a generic winding A, and the sense voltage Ia*Rs and the phase voltage Va–Vct are amplified by operational amplifiers coupled to the winding through a network of input and feedback resistors R1, ..., R8. In the circuit of FIG. 5, the reconstructed phase current Ia is processed by a circuit GAIN AND DIFFERENTIAL BLOCK for generating a signal representing the voltage drop $R \cdot I_A + L \cdot \partial I^*_A / \partial t$, to be subtracted from the reconstructed phase voltage Vpha for generating a replica of the back-electromotive force BemfA of the winding A. Eventually, as in the circuit of FIG. 6, the reconstructed voltage and current Vpha and Ia are converted in digital form using analog-to-digital converters (ADC) and the digital replicas thereof are processed by a calculation circuit, such as the FPGA (Field Programmable Gate Array) shown in the figures, that generates a digital replica of the voltage $BEMF_A$.

This technique requires additional analog components, i.e., at least a sense resistor Rs in series to the winding and operational amplifiers coupled thereto through a network of input and feedback resistors R1, ..., R8, for generating a replica Vpha of the phase voltage Va–Vct and/or a replica of the phase current Ia.

SUMMARY

This disclosure provides a switching controller of a poly-phase electric motor implementing a method for generating, in a fully digital manner, a replica of the phase current and/or of the phase (star) voltage of one or more windings of the motor. The switching controller need not include dedicated analog components for reconstructing a replica of the phase current or the phase voltage because it exploits digital signals already available which are used for driving the motor.

According to an example embodiment, a digital replica of the phase voltage of a winding of a three-phase electric motor may be generated to represent the difference between twice the switching duty-cycle of that winding and the sum of the switching duty-cycles of the other two windings of the motor.

More particularly, the switching controller may include a nonvolatile memory storing a current or voltage profile for each winding of the motor, and a control circuit configured to retrieve from the memory during operation current or voltage profiles corresponding to phase currents or voltages to be forced through or to be applied to phase terminals of the windings of the motor, respectively. The switching controller may include a sampling circuit that samples the voltage drop on the high-side or low-side switch of the half-bridge that drives the winding, when the high-side or low-side switch is on, respectively. The sampling circuit may generate a digital replica of the phase current in that winding as the product between the sampled voltage value and the current profile, retrieved from the memory, that corresponds to the phase current being forced throughout the winding.

DETAILED DESCRIPTION

In the ensuing description, reference will be made to a three-phase electric motor with star-connected windings, although these teachings may be adapted to a three-phase electric motor with delta-connected windings by the skilled artisan with knowledge of how to transform a star connection into a polygon connection and vice-versa, or more generally adapted to a generic poly-phase electric motor with star-connected or polygon-connected windings.

Figure 7:
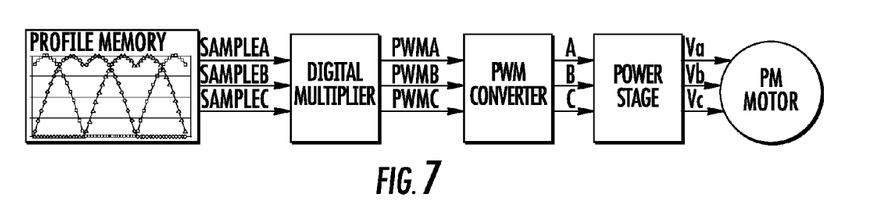
FIG. 7 is a schematic block diagram illustrating digital blocks for implementing the smooth driver of FIG. 1 that are exploited by the switching controller in accordance with an example embodiment of the present disclosure.

FIG. 7 schematically illustrates digital blocks which may be used to implement the smooth driver of FIG. 1 that are exploited by the switching controller of the present disclosure. The block PROFILE MEMORY corresponds to the block 2 in FIG. 1, the block DIGITAL MULTIPLIER corresponds to the block 3 in FIG. 1, the block PWM CONVERTER corresponds to the block 4 in FIG. 1, the block POWER STAGE represents the power stage including the three half-bridges, and the block PM MOTOR represents the electric motor, which typically is a permanent magnet motor. The blocks 6, 7, 8 and KVAL in FIG. 1 have been omitted in FIG. 7 for clarity to show only the blocks of the smooth driver that make available the digital signals that are used for generating digital signals representing the phase voltages and/or the phase currents. The ensuing description illustrates also innovative circuits for generating a digital signal representing the back electromotive force BemfA, which may be used instead of the sensing circuit of FIG. 2 for realizing an innovative smooth driver.

Figure 8:
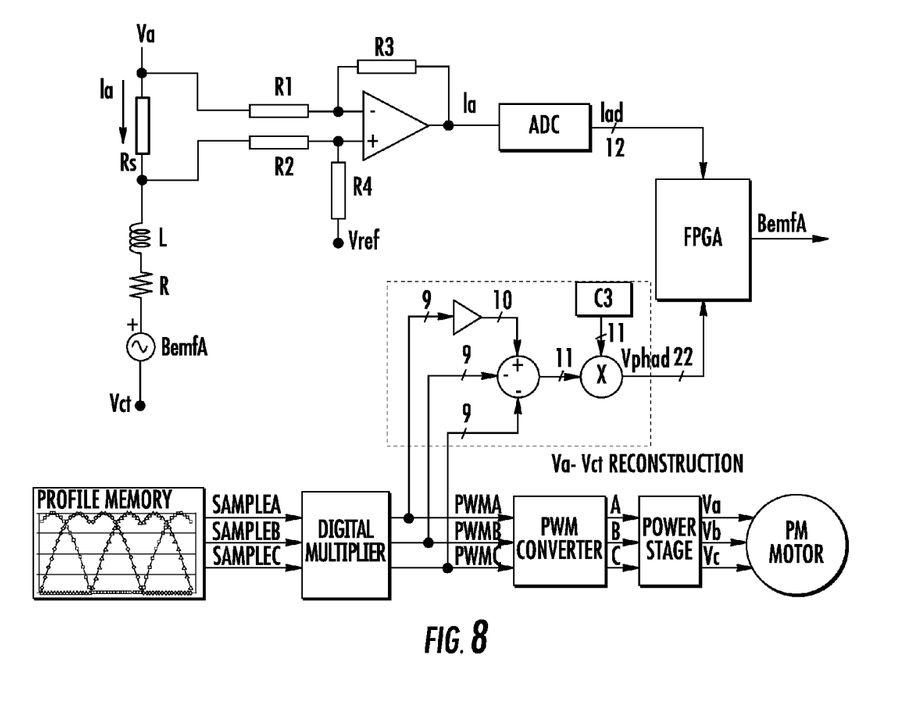
FIG. 8 is a schematic block diagram of an example embodiment of a switching controller in accordance with the present disclosure that includes a circuit for generating a digital replica Vphad of the phase voltage in a winding.

FIG. 8 illustrates a switching controller of a three-phase electric motor including a fully digital phase voltage reconstruction circuit (within the dashed border) for generating a digital signal Vphad that represents the phase voltage of a winding A of the motor. Therefore, the signal Vphad, which is substantially a replica of the phase voltage on the winding A, is obtained using digital control values PWMA, PWMB and PWMC already generated in switching controllers and without using the analog operational amplifiers shown in FIGS. 5 and 6. As shown in the exemplary embodiment of FIG. 8, the digital control values PWMA, PWMB and PWMC may be digital words of 9 bits, though the same observations hold also if the digital control values are constituted by a different number of bits.

The switching controller may optionally include an analog circuit for generating a digital replica Iad of the phase current flowing throughout the winding A, as in the prior architecture depicted in FIG. 6, to generate a digital replica of the back electromotive force $BEMF_A$.

The digital control values PWMA, PWMB and PWMC may be used to obtain a replica of the phase voltage on a generic winding A because they are tied to the instantaneous driving voltages Va, Vb and Vc applied on the phase terminals of the windings. More particularly, the cascade of the PWM converter and of the power stage of the switching controller generates the driving voltages Va, Vb and Vc as follows:

$$Va = \frac{PWMA * Vmotor}{MaxSampleVal}$$

$$Vb = \frac{PWMB * Vmotor}{MaxSampleVal}$$

$$Vc = \frac{PWMC * Vmotor}{MaxSampleVal}$$

where MaxSampleVal is the maximum value of the digital control values PWMA, PWMB, PWMC, and Vmotor is the nominal value of power supply. The phase voltage Va–Vct is given by the following equation:

$$Va - Vct = \frac{2 \cdot Va - Vb - Vc}{3}$$

$$= \frac{Vmotor}{MaxSampleVal} \cdot \frac{2 \cdot PWMA - PWMB - PWMC}{3}$$

with $V_{CT}$ being the center-star voltage.

According to an example embodiment, the digital voltage signal Vphad that represents the phase voltage Va−Vct is generated by subtracting the digital control values PWMB and PWMC from twice the value PWMA, and by multiplying this difference by a coefficient C3:

Vphad=C3·(2·PWMA−PKVB−PWMC)

Thus, it is not necessary to sense the phase voltage, as in the circuit of FIG. 2, nor is it necessary to provide an analog-to-digital conversion, as in the circuit of FIG. 6.

In a poly-phase electric motor, the above equations may be relatively easily reformulated recalling that the sum of all phase (star) voltages is 0. Thus, it is possible to generate the digital voltage signal Vphad as a function of the digital control values representing the switching duty-cycles of the half-bridges of the N windings of the motor.

To calculate the back electromotive force BemfA, the signal Vphad is summed to values representing the Ohmic voltage drop R*Iad and inductive voltage drop $$L \times \frac{d(Iad)}{dt},$$

where the digital value Iad is obtained by converting into digital form an analog replica of the phase current Ia. The dynamics of digitalization of Vphad and Iad are in general different from each other, thus the coefficient C3 is chosen to generate a signal Vphad with a digital dynamic equal to the dynamic into which the signal Iad has been digitized, $$C3 = \frac{Vmotor * K_{PROFILE} * ADC_{MAX}}{3 * MaxSampleVal * Ipha \, max}$$

where: Vmotor is the nominal power supply value; Kprofile is the coefficient that takes in account the voltage profile shape and it is equal to 1 in the case of a sinusoidal shape; ADCmax is the digital value of the current Ia when the phase current Ia attains its peak value; MaxsampleVal is the maximum value of profile samples (that is 511 in actual smooth drivers); and Iphamax is the maximum undistorted peak value of Ia that an algorithm that does not contemplate time windows is able to manage. The coefficient C3 does not depend on the supply variation but is tied to its nominal value Vmotor. Indeed, in smooth drivers the control values PWMA, PWMB and PWMC are already compensated against power supply variations because they are modulated by a power supply FF algorithm, thus the value Vphad is automatically compensated without changing the coefficient C3.

Alternatively to the above-described on-the-fly calculation, the values of Vphad may be stored beforehand into the nonvolatile memory together with the three normalized voltage profiles, as a fourth normalized profile subject to amplitude modulation. An example is shown in the following exemplary table:

| PWMA | PWMB | PWMC | Vphad |
|------|------|------|-------|
| 511  | 226  | 0    | 796   |
| 502  | 165  | 0    | 839   |
| 485  | 100  | 0    | 870   |
| ...  | ...  | ...  | ...   |

According to another embodiment of the present switching controller, it is possible to generate a digital current signal Ira representing the phase current in a winding of the electric motor without using a sense resistor. The switching controller of FIG. 9 includes a fully digital phase current reconstruction circuit IaReconstruction that uses the following signals that are already available in smooth drivers.

Figure 9:
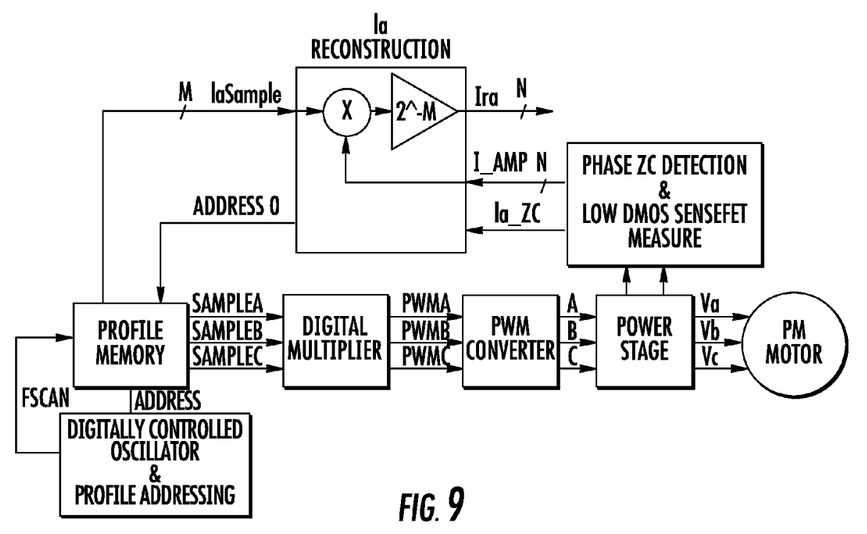
FIG. 9 is a schematic block diagram of another example embodiment of a switching controller of the present disclosure that includes a circuit for generating a digital replica Ira of the phase current.

A logic flag Ia_ZC indicates the occurrence of positive (or negative) zero crosses of the phase current in the considered winding A. According to a known technique, information on the sign of the current is obtained by sampling the half-bridge output during dead-times. This logic flag Ia_ZC is already used in smooth drivers for maximizing the driving torque. The current reconstruction circuit IaReconstruction may include a memory address generator (not shown) coupled to either the low-side switch or the high-side switch to generate a start signal Address0 synchronous with positive (or negative) zero-crosses of the phase current to make the nonvolatile memory PROFILE MEMORY provide the leading sample of a stored profile IaSample of the phase current forced throughout the winding A.

The amplitude signal I_AMP is obtained by sampling the voltage drop on the low-side (high-side) switch (typically a DMOS sense FET) when a current is flowing therethrough. This is already used by classic current limit algorithms in smooth drivers for monitoring the amplitude of the phase current and for limiting it to a programmed value. Therefore, the amplitude of the phase current flowing throughout the winding A is represented by the signal I_AMP, which is used in the switching controller of FIG. 9 to modulate the samples of the current profile IaSample retrieved from the nonvolatile memory PROFILE MEMORY to generate in a fully digital form a digital current signal Ira representing the phase current Ia in the winding A.

The circuit that generates the signals Ia_ZC and I_AMP has been represented with a block PHASE ZC DETECTION & LOW DMOS SENSEFET MEASURE coupled with the power stage that drives the electric motor.

Therefore, the switching controller of FIG. 9 senses only the peak of the phase current Ia, and this may be done with a low side DMOS sense FET without using a sense resistor in series to the motor winding. It should be noted that the sense resistor is essentially mandatory in the prior circuits of FIGS. 5 and 6 because monitoring the voltage drop on the low-side (or high-side) switch is insufficient for reconstructing the whole phase current. Indeed, the voltage drop on the low-side (or high-side) switch provides information on the phase current only during the negative (positive) half-wave thereof and is affected by distortions that increase as long as the phase current approaches zero.

By contrast, in the switching controller of FIG. 9, the phase current profile is already available in the nonvolatile memory. Thus, only the start instant of the profile (given by the signal Ia_ZC) and its amplitude (given by the signal I_AMP) need to be determined.

According to known techniques, a digital controlled oscillator and a generator of memory addresses for the nonvolatile memory PROFILE MEMORY, represented with the block DIGITALLY CONTROLLED OSCILLATOR & PROFILE ADDRESSING, are already available in smooth drivers and generate the address signal ADDRESS for retrieving from the nonvolatile memory the sequence of values representing the desired current profile. The signals ADDRESS and Fscan, the latter being used to scan the memory, cause the nonvolatile memory to output digital values of sinusoidal voltage profile samples SampleA, SampleB and SampleC.

Together with these blocks, the present switching controller uses the same memory to generate the samples of the desired current profile IaSample, updated with the same frequency Fscan but reset with the start signal Address0. This start signal causes the retrieval of the profile IaSample from the beginning by pointing to the leading sample thereof. The signal Address0, which according to an example embodiment is the zero-cross signal Ia_ZC itself or a modified replica thereof adapted to be provided in input to the nonvolatile memory, is essentially a profile scanning reset that forces the first sample of the profile at its output IaSample whenever a zero-cross event of the phase current occurs. After the Address0 has been asserted, the scanning of the profile follows the usual rate fixed by the signal Fscan, that is at every Fscan event the next samples of the profiles are delivered on the outputs SampleA, SampleB, SampleC and IaSample.

Accordingly, SampleA, SampleB, SampleC and IaSample are samples scanned at the same rate (Fscan) but with different offsets. Samples at IaSample are then amplitude modulated to have peak values equal to that of signal I_AMP coming from the analog-to-digital converter ADC that digitizes the voltage drop on the low-side switch (DMOS sense FET).

The reconstructed phase current Ira has the same amplitude, frequency and phase of the real phase current Ia. With this technique, the phase current is no longer sensed in the analogic domain on the whole cycle, but is fully digitally reconstructed by sampling Ia peaks only (between two consecutive zero-crosses of the phase current) and by exploiting digital signals already present in smooth drivers.

This technique of reconstructing the phase current in the digital domain may be combined with the technique disclosed in FIG. 8 for realizing a circuit, now described with reference to FIG. 10, that generates digital replicas of the phase current Ira and of the phase voltage Vphad using the previously mentioned signals Ia_ZC, I_AMP, and the control signals PWMA, PWMB and PMWC already available in switching controllers. The block $1/z$ represents a time-shifting operator in the domain of the Z-transform. C1 and C2 are multiplication factors and LPFilter is a low-pass filter. As shown in the exemplary embodiment of FIG. 10, the digital control values PWMA, PWMB and PWMC may be digital words of 9 bits, the coefficient C1 may be 8 bits and the coefficient C2 may be 10 bits, though the same observations hold if these coefficients have different numbers of bits.

According to known techniques, the digital replicas Ira and Vphad may be processed for generating:

a first signal DIrad representing in the digital domain the time derivative of the phase current of the winding A as the difference between the signals Ira and a time-shifted replica thereof; a second signal VRa representing the voltage drop on the resistance of the winding A as the product of the signal Ira by the coefficient C1;

a third signal VLa representing the voltage drop due to the inductance of the winding A as the product of the signal DIrad by the coefficient C2; and a digital replica signal BemfA of the back electromotive force as a low-pass filtered replica of the difference between the signal Vphad and the sum of the signals VRa and VLa.

Figure 10:
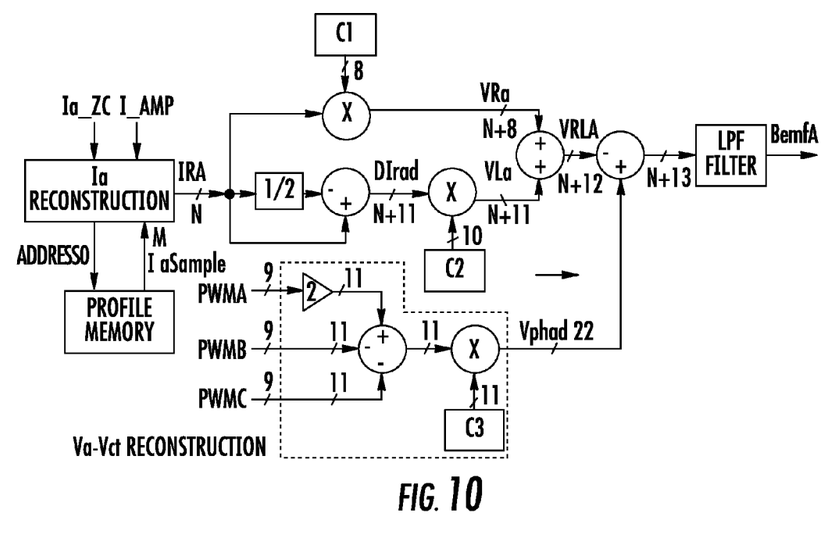
FIG. 10 is a schematic block diagram of yet another example embodiment of a circuit of a switching controller of the present disclosure for generating a digital signal representing the back electromotive force induced on a winding using the digital signals Vphad and Ira generated by the circuits shown in FIGS. 8 and 9.

The circuit of FIG. 10 may be used in place of the analog sensing circuit of FIG. 2 in the block 5 of the smooth driver of FIG. 1. This provides for a smooth driver that need not include analog sensing circuits directly connected to the windings of the motor for determining the back-electromotive force induced therein.

That which is claimed is:

1. A switching controller for a poly-phase electric motor comprising a plurality of windings and a respective half-bridge stage for driving each of the windings, the windings having respective phase terminals associated therewith, and each half-bridge stage having a respective switch associated therewith, the switching controller comprising:

a memory configured to store a current profile for each winding of the motor;

a control circuit configured to retrieve current profiles from said memory corresponding to phase currents associated with the phase terminals of the windings of the electric motor; and a digital phase current reconstruction circuit configured to generate a signal representing a phase current of at least one winding of the electric motor;

said control circuit being configured to generate at least one digital word of a value of a current profile retrieved from said memory representing a scaled replica of the phase current through the at least one winding;

said switching controller comprising a sampling circuit configured to sample the voltage drop on the switch of the respective half-bridge of the at least one winding, said sampling circuit being configured to generate a digital amplitude signal representing a peak value of the phase current of said at least one winding sampled between two consecutive zero-cross events of the phase current when the switch is on;

said phase current reconstruction circuit being configured to receive as inputs the digital amplitude signal and the at least one digital word of the retrieved current profile, and to generate a digital current signal representing the phase current in the at least one winding based thereon.

2. The switching controller of claim 1 wherein said phase current reconstruction circuit is configured to generate the at least one digital current signal as the product between the digital word of the retrieved current profile and the digital amplitude signal.

3. The switching controller of claim 1 wherein the switch of the respective half-bridge of the at least one winding comprises at least one of a low-side switch and a high-side switch.

4. The switching controller of claim 1 wherein said current reconstruction circuit further comprises a memory address generator coupled to the switch of the respective half-bridge of the at least one winding and configured to generate a start signal synchronously with positive or negative zero-crosses of the phase current flowing through the switch; and wherein said control circuit is configured to retrieve the current profile from said memory when the start signal is asserted.

5. The switching controller of claim 1 wherein the electric motor comprises a three-phase electric motor; wherein said control circuit is configured to generate corresponding digital control values representing switching duty-cycles of the half-bridge stage of each winding of the electric motor; and wherein said switching controller further comprises a digital phase voltage reconstruction circuit configured to receive as inputs the digital control values and to generate a digital voltage signal representing the phase voltage of the at least one winding of the electric motor.

6. The switching controller of claim 5 wherein said digital phase voltage reconstruction circuit is configured to generate the digital voltage signal to correspond to a difference 2*PWMA-PWMB-PWMC between twice the digital control value representing the switching duty-cycle PWMA for the at least one winding and the sum of the digital control values PWMB =PWMC representing switching duty-cycles for the other two windings of the three-phase electric motor.

7. The switching controller of claim 5 further comprising a calculation circuit configured to receive as inputs the digital current signal of the phase current in the at least one winding and the digital voltage signal representing the phase voltage of the at least one winding, said calculation circuit being configured to generate a digital replica of the back electromotive force induced in the at least one winding by the rotation of the three-phase electric motor.

8. The switching controller of claim 7 wherein said calculation circuit is configured to generate the digital replica of the back electromotive force as the difference between the digital voltage signal and the sum of a first term proportional to the digital current signal and a second term proportional to the time increase thereof.

9. A method of generating a digital current signal representing a phase current of at least one winding of a poly-phase electric motor, each winding being driven by a respective half-bridge stage having a switch associated therewith, and the windings having respective phase terminals associated therewith, the method comprising:
    retrieving a current profile from a memory corresponding to a phase current associated with the phase terminals of at least one winding of the electric motor;
    generating at least one digital word corresponding to a peak value of a current profile retrieved from the memory representing a scaled replica of the phase current;
    sampling a voltage drop on the switch of the respective half-bridge of the at least one winding;
    generating a digital amplitude signal corresponding to the phase current of the at least one winding sampled between two consecutive zero-cross events of the phase current when the switch is on; and
    generating the digital current signal representing the phase current in the at least one winding.

10. The method of claim 9 wherein generating the digital current signal comprises generating the digital current signal as the product between the at least one digital word of the retrieved current profile and the digital amplitude signal.

11. The method of claim 10 further comprising generating a digital voltage signal representing a phase voltage of the at least one winding.

12. The method of claim 11 wherein generating the digital voltage signal comprises:
    generating corresponding digital control values PWMA, PWMB, PWMC representing switching duty-cycles of the half-bridge of each winding of the motor; and
    generating the digital voltage signal representing of the phase voltage of the at least one winding of the electric motor as a difference 2*PWMA-PWMB-PWMC between twice the digital control value representing the switching duty-cycle PWMA for the at least one winding and the sum of the digital control values PWMB =PWMC representing switching duty-cycles of the half-bridges of the other two windings of the three-phase motor.

13. The method of claim 11 further comprising generating a digital replica signal of the back electromotive force induced in the at least one winding by the rotation of the electric motor as a difference between the digital voltage signal and a sum of a first term proportional to the digital current signal and a second term proportional to the time increase thereof.

14. A switching controller for a three-phase electric motor comprising a plurality of windings and a respective half-bridge stage for driving each of the windings, the switching controller comprising:
    a control circuit configured to generate corresponding digital control values PWMA, PWMB, PWMC representing switching duty-cycles of the half-bridge of each winding of the electric motor; and
    a digital phase voltage reconstruction circuit, configured to generate a signal representing a phase voltage of at least one winding of the electric motor;
    said digital phase voltage reconstruction circuit being configured to receive as inputs the digital control values PWMA, PWMB, PWMC and to generate a digital voltage signal representing the phase voltage of the at least one winding of the electric motor based thereon;
    said digital phase voltage reconstruction circuit is configured to generate the digital voltage signal based upon a difference 2*PWMA-PWMB-PWMC between twice the digital control value representing the switching duty-cycle PWMA for the at least one winding and a sum of the digital control values PWMB =PWMC representing switching duty-cycles for the other two windings of the three-phase motor.

15. The switching controller of claim 14 further comprising a memory configured to store at least one of a current profile and a voltage profile for each winding of the motor; and wherein said control circuit is configured to retrieve the current or voltage profiles.

16. A method of generating a digital voltage signal representing a phase voltage of at least one winding of a three-phase electric motor, the method comprising:
    generating corresponding digital values PWMA, PWMB, PWMC representing switching duty-cycles of the half-bridge of each winding of the electric motor; and
    generating a digital voltage signal representing the phase voltage of the at least one winding of the motor based upon the digital values PWMA, PWMB, PWMC by generating the digital voltage signal as a difference 2*PWMA-PWMB-PWMC between twice the digital control value representing the switching duty-cycle for the at least one winding and the sum of the digital control values PWMB =PWMC representing switching duty-cycles of the half-bridges of the other two windings of the three-phase motor.

* * * * *